United States Patent
Yoo et al.

(10) Patent No.: US 12,152,127 B2
(45) Date of Patent: *Nov. 26, 2024

(54) PLASTICIZER COMPOSITION

(71) Applicant: Hanwha Solutions Corporation, Seoul (KR)

(72) Inventors: Myung-Ik Yoo, Daejeon (KR); Jaesong Kim, Daejeon (KR); Hee-Ra Kwak, Daejeon (KR); Sungmin Ryoo, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,320

(22) Filed: Dec. 29, 2021

(65) Prior Publication Data

US 2022/0204727 A1 Jun. 30, 2022

(30) Foreign Application Priority Data

Dec. 29, 2020 (KR) ........................ 10-2020-0186414

(51) Int. Cl.
*C08F 14/06* (2006.01)
*C08K 5/11* (2006.01)
*C08K 5/12* (2006.01)

(52) U.S. Cl.
CPC ................ *C08K 5/12* (2013.01); *C08F 14/06* (2013.01); *C08K 5/11* (2013.01); *C08K 2201/014* (2013.01)

(58) Field of Classification Search
CPC ...... C08K 5/12; C08K 5/11; C08K 2201/014; C08F 14/06
See application file for complete search history.

(56) References Cited

U.S. PATENT DOCUMENTS

| | | | |
|---|---|---|---|
| 11,572,453 B2 * | 2/2023 | Kim ......................... | C08K 5/12 524/293 |
| 2013/0317152 A1 | 11/2013 | Becker et al. | |
| 2017/0081501 A1 * | 3/2017 | Kim ......................... | C08K 5/12 |
| 2017/0145186 A1 | 5/2017 | Pfeiffer et al. | |
| 2017/0145187 A1 | 5/2017 | Pfeiffer et al. | |
| 2017/0313848 A1 | 11/2017 | Pfeiffer et al. | |
| 2018/0134870 A1 | 5/2018 | Tiyapiboonchaiya et al. | |
| 2019/0194420 A1 | 6/2019 | Devine et al. | |

FOREIGN PATENT DOCUMENTS

| | | | | |
|---|---|---|---|---|
| CN | 101245009 | | 8/2008 | |
| CN | 101260201 | | 9/2008 | |
| CN | 101302158 | | 11/2008 | |
| CN | 102241592 | * | 11/2011 | ............ C07C 29/74 |
| CN | 104230714 | * | 12/2014 | ............ C07C 69/82 |
| CN | 104496819 | * | 7/2016 | ............ C07C 69/82 |
| CN | 107281776 | | 10/2017 | |
| EP | 2666819 | | 11/2013 | |
| EP | 3130631 | | 2/2017 | |
| EP | 3476890 | | 5/2019 | |
| EP | 3502175 | | 6/2019 | |
| EP | 3670592 | | 6/2020 | |
| EP | 4023708 | | 7/2022 | |
| EP | 4032949 | | 7/2022 | |
| JP | 2012-152932 | | 8/2012 | |
| JP | 2016008255 | | 1/2016 | |
| JP | 2017-533305 | | 11/2017 | |
| JP | 2018-525468 | | 9/2018 | |
| KR | 10-2012-0083560 | | 7/2012 | |
| KR | 10-2016-0099453 | | 8/2016 | |
| KR | 2016-0099453 | | 8/2016 | |
| KR | 10-2017-0066548 | | 6/2017 | |
| KR | 10-2017-0066668 | | 6/2017 | |
| KR | 2018-0092888 | | 8/2018 | |
| KR | 10-2020-0140084 | | 12/2020 | |
| WO | 2016-055572 | | 4/2016 | |
| WO | WO2017/200293 | * | 11/2017 | ............ C08K 5/12 |
| WO | 2020-114642 | | 6/2020 | |
| WO | 2021-054695 | | 3/2021 | |

OTHER PUBLICATIONS

U.S. Appl. No. 17/642,241, filed Oct. 2022, Ryoo.*
CN104230714 English Translation (Year: 2014).*
CN102241592A English (Year: 2011).*
CN104496819B English translation (Year: 2016).*
EPO, Extended European Search Report of the corresponding European Patent Application No. 21217961.8., dated May 17, 2022.
EPO, Extended European Search Report of the corresponding European Patent Application No. 21217962.6., dated May 17, 2022.
"Technical Information Petrochemicals Plasticizers", TI/N-CPN/IP Palatinol® DOTP Apr. 2021, BASF Corporation.

* cited by examiner

*Primary Examiner* — Catherine S Branch
*Assistant Examiner* — Huihong Qiao
(74) *Attorney, Agent, or Firm* — LEX IP MEISTER, PLLC

(57) ABSTRACT

The present disclosure relates to a plasticizer composition that is environmentally friendly by including a recycled raw material, and has excellent gelling properties, plasticization efficiency, and weather resistance.

13 Claims, No Drawings

PLASTICIZER COMPOSITION

CROSS CITATION WITH RELATED APPLICATION(S)

The present application is based on, and claims priority from, Korean Patent Application No. 10-2020-0186414, filed on Dec. 29, 2020, the disclosures of which are hereby incorporated by reference herein in their entirety.

TECHNICAL FIELD

The present disclosure relates to a plasticizer composition including a recycled raw material.

BACKGROUND

Recently, for environmental protection and resource recycling, research has been conducted to recover useful resources from waste synthetic resins or by-products generated in the production of synthetic resins. In addition, research to reduce carbon emissions generated in the production of synthetic resin products is being actively conducted.

As a recycling technology of waste synthetic resins, in particular, a method of recycling waste polyesters is widely known. For example, a method of depolymerizing waste polyesters in the presence of a catalyst to recycle them into terephthalic acid, dimethyl terephthalate, and ethylene glycol as raw materials is known. The recycled terephthalic acid and dimethyl terephthalate may be recycled into dioctyl terephthalate, which is a useful material as a plasticizer, through esterification or transesterification. In addition, Chinese Patent Publication Nos. 104230714 and 104496819 disclose a method of recovering dioctyl terephthalate from wastewater in a polyester weight deduction process.

Dioctyl terephthalate is a widely used plasticizer, and dioctyl terephthalate recovered through the recycling process may also be used as a plasticizer for polymer resins. However, the recycled dioctyl terephthalate has disadvantages such as a yellow color and a foul smell compared to pure dioctyl terephthalate due to impurities mixed in during the recycling process. Accordingly, there is a problem in that the recycled dioctyl terephthalate can be used only in the manufacture of relatively low-quality products.

Therefore, it is required to develop a plasticizer composition capable of obtaining the effect of reducing carbon emissions in the resource recycling and manufacturing processes with excellent quality.

BACKGROUND ART LITERATURE

Patent Literature (Patent Literature 0001) Chinese Patent Publication No. 104230714
(Patent Literature 0002) Chinese Patent Publication No. 104496819

DETAILED DESCRIPTION OF THE INVENTION

Technical Problem

In the present disclosure, there is provided a plasticizer composition having excellent physical properties while including a recycled phthalate-based compound obtained from waste polyester or wastewater generated in the production of a polyester.

Technical Solution

According to one embodiment of the present disclosure, there is provided a plasticizer composition, including
a) a recycled phthalate-based compound as a first plasticizer; and
b) a citrate-based compound as a second plasticizer,
wherein the first plasticizer is included in an amount of 90 parts by weight or less based on 100 parts by weight of the plasticizer composition.

According to another embodiment of the present disclosure, there is provided a resin composition including the above plasticizer composition; and at least one resin selected from the group consisting of polyvinyl chloride, polystyrene, polyurethane, polypropylene, polybutadiene, silicone, modified silicone, ethylene vinyl acetate resin, and thermoplastic elastomer.

According to another embodiment of the present disclosure, there is provided a molded product including the above resin composition.

Advantageous Effects

The plasticizer composition according to the present disclosure includes a recycled raw material, but has little yellow color and odor with excellent plasticization efficiency, a fast gelling rate, low plasticizer migration characteristics, and excellent weather resistance, so that it can be used as a general-purpose plasticizer.

Detailed Description of the Embodiments

The terminology used herein is for the purpose of describing particular embodiments only and is not intended to be limiting of the invention. The singular forms are intended to include the plural forms as well, unless the context clearly indicates otherwise.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the plasticizer composition, the resin composition including the same, and the molded product of the present invention will be described in more detail.

Plasticizer Composition

First Plasticizer

The plasticizer composition of the present disclosure includes a recycled phthalate-based compound as the first plasticizer.

In the present disclosure, the recycled phthalate-based compound refers to a phthalate-based compound that is not synthesized from pure raw materials, but is recovered from wastes through reprocessing.

Herein, the phthalate-based compound refers to a compound represented by the following Chemical Formula 1:

[Chemical Formula 1]

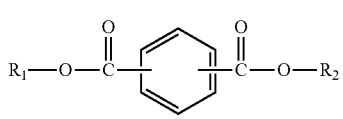

in Chemical Formula 1, $R_1$ and $R_2$ are each independently a C4 to C12 linear or branched alkyl group.

Preferably, $R_1$ and $R_2$ may each independently be n-butyl, n-hexyl, n-octyl, 2-ethylhexyl, isononyl, or isodecyl.

The phthalate-based compound of Chemical Formula 1 may be represented by the following Chemical Formulae 1-1 to 1-3 depending on the position of the substituent.

[Chemical Formula 1-1]

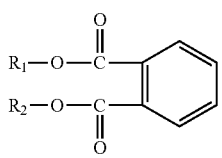

[Chemical Formula 1-2]

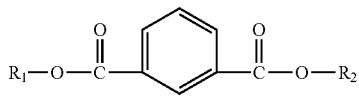

[Chemical Formula 1-3]

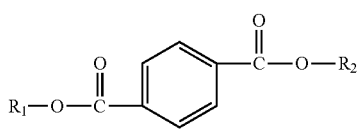

in Chemical Formulae 1-1 to 1-3, $R_1$ and $R_2$ are as defined in Chemical Formula 1.

The Chemical Formula 1-1 is a phthalate compound, the Chemical Formula 1-2 is an isophthalate compound, and the Chemical Formula 1-3 is a terephthalate compound.

Specific example of the phthalate compound represented by the Chemical Formula 1-1 may be dibutyl phthalate (DBP), dihexyl phthalate (DHP), dioctyl phthalate (DOP; or di(2-ethylhexyl)phthalate), di-n-octyl phthalate (DnOP), diisononyl phthalate, or diisodecyl phthalate (DIDP).

Specific example of the isophthalalate compound represented by the Chemical Formula 1-2 may be dibutyl isophthalalate (DBIP), dioctyl isophthalate (DOIP; or di(2-ethylhexyl)isophthalate), diisononyl isophthalate (DINIP), or diisodecyl isophthalate (DIDIP).

Specific example of the terephthalate compound represented by the Chemical Formula 1-3 may be dibutyl terephthalate (DBTP), dioctyl terephthalate (DOTP; or di(2-ethylhexyl)terephthalate), diisononyl terephthalate (DINTP), or diisodecyl terephthalate (DIDTP).

The recycled phthalate-based compound of the present disclosure may be any one or a mixture of the above-described phthalate compound, isophthalate compound, and terephthalate compound. Preferably, recycled dioctyl terephthalate may be used as the recycled phthalate-based compound.

The recycled phthalate-based compound used in the present disclosure may be a commercially available product, or may be obtained from wastes using by using a known method.

For example, the recycled phthalate-based compound may be obtained by depolymerizing waste polyesters to obtain an aromatic dicarboxylic acid or an ester thereof, and reacting it with appropriate alcohol.

Alternatively, phthalic acid is extracted from wastewater discharged during caustic reduction processing of polyester fibers, wastewater generated in the production of pure terephthalate-based compounds, and wastes such as residues after filtration, and reacted with alcohol to obtain recycled phthalate-based compounds.

In the present disclosure, the recycled phthalate-based compound is included in an amount of 90 parts by weight or less based on 100 parts by weight of the total plasticizer composition.

Recycled phthalate-based compounds have a yellow color and a foul smell like oil due to impurities mixed in during the recycling process from wastes. In addition, the recycled phthalate-based compound often has a high acid value. Due to these problems, the recycled phthalate-based compound has a problem in that it is difficult to apply it in the manufacture of high-quality products in which color or smell is important.

Accordingly, the present disclosure controls the content of the recycled phthalate-based compound to 90 parts by weight or less based on 100 parts by weight of the plasticizer composition and uses a citrate-based compound together with the recycled phthalate, thereby solving color and odor problems derived from the recycled phthalate-based compound.

Preferably, the first plasticizer, that is, the recycled phthalate-based compound may be included in an amount of 88 parts by weight or less, 86 parts by weight or less, 85 parts by weight or less, 83 parts by weight or less, or 80 parts by weight or less, and 15 parts by weight or more, 20 parts by weight or more, 25 parts by weight or more, 30 parts by weight or more, 35 parts by weight or more, 40 parts by weight or more, 45 parts by weight or more, or 50 parts by weight or more based on 100 parts by weight of the plasticizer composition.

As described above, since the plasticizer composition of the present disclosure includes a pure citrate-based compound, not a recycled raw material, as a second plasticizer together with the first plasticizer, it is possible to supplement the disadvantages of using a recycled raw material. Accordingly, physical properties of the recycled phthalate-based compound used in the present disclosure are not particularly limited, but it may be more preferable to use a recycled phthalate-based compound having a low acid value in order to obtain a high-quality plasticizer.

Specifically, in order to improve the quality of the plasticizer, the acid value of the recycled phthalate-based compound is preferably 0.2 KOH mg/g or less, 0.18 KOH mg/g or less, 0.15 KOH mg/g or less, or 0.12 KOH mg/g or less. There is no specific lower limit, because the lower acid value can be evaluated as the better. In theory, the lower limit may be 0 KOH mg/g. However, as described above, the recycled phthalate-based compound has a higher acid value than that of a pure plasticizer, and the acid value of the recycled phthalate-based compound may be 0.05 KOH mg/g or more, 0.06 KOH mg/g or more, 0.08 KOH mg/g or more, 0.09 KOH mg/g or more, or 0.1 KOH mg/g or more. In particular, when the acid value of the first plasticizer is high, the color of the composition may change from colorless and transparent to yellow or brown, or the odor may be severe. Alternatively, since there is a possibility that migration resistance of the final product using the plasticizer having a high acid value is inferior, it is preferable that the first plasticizer maintains the acid value within the above range.

Herein, the acid value is a weight (mg) of potassium hydroxide (KOH) required to neutralize the acid contained in 1 g of a sample, and can be obtained by titrating the sample solution with an alcoholic KOH solution having a concentration of 0.1 N.

Second Plasticizer

The plasticizer composition of the present disclosure includes a citrate-based compound as a second plasticizer. The citrate-based compound is prepared from a pure raw material, and can supplement the characteristics of the recycled phthalate-based compound, which is the first plasticizer, such as high acid value, color, and odor. In addition, it is used together with the first plasticizer to improve thermal stability of the plasticizer composition, and enhance plasticization efficiency, plasticizer migration characteristics, and gelling rate.

The citrate-based compound is represented by the following Chemical Formula 2:

[Chemical Formula 2]

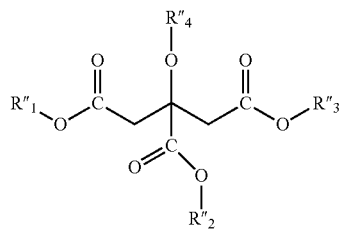

in Chemical Formula 2, $R''_1$, $R''_2$, and $R''_3$ are each independently a C2 to C12 linear or branched chain alkyl group, and $R''_4$ is hydrogen or an acetyl group.

Preferably, $R''_1$, $R''_2$, and $R''_3$ are each independently a butyl group, an isobutyl group, a pentyl group, a hexyl group, a heptyl group, a 2-ethylhexyl group, an octyl group, a nonyl group, an isononyl group, a 2-propylheptyl group, a decyl group, an isodecyl group, or a stearyl group. Preferably, $R''_1$, $R''_2$, and $R''_3$ are each independently a butyl group, a 2-ethylhexyl group, or an isononyl group.

The citrate-based compound of Chemical Formula 2 may be represented by the following Chemical Formula 2-1 or 2-2 depending on the position of the substituent.

[Chemical Formula 2-1]

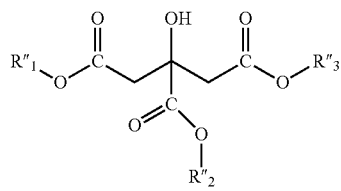

[Chemical Formula 2-2]

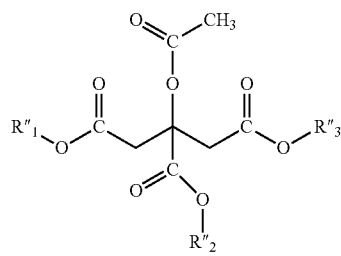

in Chemical Formulae 2-1 to 2-2, $R''_1$, $R''_2$, and $R''_3$ are as defined in Chemical Formula 2.

In one embodiment, the citrate-based compound may be at least one selected from the group consisting of triethyl citrate, acetyl triethyl citrate, tributyl citrate, acetyl tributyl citrate, trioctyl citrate, acetyl trioctyl citrate, trihexyl citrate, and acetyl trihexyl citrate.

Preferably, the citrate-based compound may be at least one selected from the group consisting of tributyl citrate and acetyl tributyl citrate.

The tributyl citrate or acetyl tributyl citrate has low viscosity at room temperature and low temperatures to realize excellent coating properties, has a fast gelling rate, and has better plasticization efficiency and plasticizer migration resistance than other cyclohexane dicarboxylate-based compounds. Accordingly, when tributyl citrate or acetyl tributyl citrate is used, physical properties of the plasticizer composition can be further improved while supplementing color and odor problems caused by the recycled phthalate-based compound.

A citrate-based plasticizer other than the above tributyl citrate or acetyl tributyl citrate can also be used. However, if its molecular weight is high, processing may not be smooth due to the high viscosity and the slow gelling rate. And if its molecular weight is low, the plasticizer volatilizes during processing, causing contamination of the processing equipment as well as lowering physical properties of final products.

The second plasticizer may be included in an amount of 10 parts by weight or more, 12 parts by weight or more, 15 parts by weight or more, 18 parts by weight or more, or 20 parts by weight or more, and 85 parts by weight or less, preferably 80 parts by weight or less, 75 parts by weight or less, 70 parts by weight or less, 65 parts by weight or less, 60 parts by weight or less, 55 parts by weight or less, or 50 parts by weight or less based on 100 parts by weight of the plasticizer composition.

When the content of the second plasticizer is less than 10 parts by weight based on 100 parts by weight of the plasticizer composition, it may be insufficient to supplement the physical properties of the recycled phthalate-based compound. In addition, when the content of the second plasticizer exceeds 85 parts by weight based on 100 parts by weight of the plasticizer composition, it is difficult to expect an effect of reducing carbon emissions by the use of recycled raw materials.

In one embodiment of the present disclosure, the first plasticizer may be recycled dioctyl terephthalate, and the second plasticizer may be at least one selected from the group consisting of tributyl citrate and acetyl tributyl citrate.

According to one embodiment of the present disclosure, the plasticizer composition may not include other plasticizers other than the above-described first and second plasticizers.

Specifically, the plasticizer composition may include 15 to 90 parts by weight of recycled dioctyl terephthalate as the first plasticizer and 85 to 10 parts by weight of at least one selected from the group consisting of tributyl citrate and acetyl tributyl citrate as the second plasticizer.

Preferably, the plasticizer composition may include 30 to 85 parts by weight of recycled dioctyl terephthalate as the first plasticizer and 70 to 15 parts by weight of at least one selected from the group consisting of tributyl citrate and acetyl tributyl citrate as the second plasticizer.

More preferably, the plasticizer composition may include 50 to 80 parts by weight of recycled dioctyl terephthalate as the first plasticizer and 50 to 20 parts by weight of at least one selected from the group consisting of tributyl citrate and acetyl tributyl citrate as the second plasticizer.

Additional Plasticizer

Meanwhile, according to another embodiment of the present disclosure, the plasticizer composition may further include an additional plasticizer in addition to the first and second plasticizers.

As the additional plasticizer, a material usually used as a plasticizer of a polymer resin may be used without limitation. For example, at least one selected from the group consisting of trimellitate-based compounds, aliphatic ester-based compounds, and epoxidized vegetable oils may be used.

Specific example of the trimellitate-based compound may be at least one selected from the group consisting of tri-(2-ethylhexyl) trimellitate, trimethyl trimellitate, trihexyl trimellitate, triheptyl trimellitate, tri-(n-octyl, n-decyl) trimellitate, and tri-(heptyl, nonyl) trimellitate.

The aliphatic ester-based compound may be an ester compound derived from an aliphatic carboxylic acid compound such as adipic acid, sebacic acid, azelaic acid, and maleic acid. Specific example of the aliphatic ester compound may be at least one selected from the group consisting of dimethyl adipate, monomethyl adipate, dioctyl adipate, diheptylnonyl adipate, di(2-ethylhexyl) adipate, diisononyl adipate, diisodecyl adipate, di(2-ethylhexyl)sebacate, dibutyl sebacate, di(2-ethylhexyl)azelate, dibutyl maleate, and diisobutyl maleate.

The epoxidized vegetable oil is epoxidized fatty acid alkyl esters prepared by epoxidizing fatty acid alkyl esters. For example, specific example of the epoxidized vegetable oil may be at least one selected from the group consisting of epoxidized soybean oil, epoxidized castor oil, epoxidized linseed oil, epoxidized palm oil, epoxidized stearate, epoxidized oleate, epoxidized tall oil, and epoxidized linoleate.

The additional plasticizer may be used alone or in combination of two or more. According to a preferred embodiment, when the epoxidized vegetable oil is mixed as the plasticizer, thermal stability and flexibility of the product can be further improved, and when the trimellitate-based compound is mixed, volatility resistance can be further improved.

When the additional plasticizer is included, the content of the additional plasticizer may be 1 part by weight or more, or 5 parts by weight or more, and 30 parts by weight or less, 20 parts by weight or less, or 10 parts by weight or less based on 100 parts by weight of the plasticizer composition. When the content of the additional plasticizer is too high, the content of the first and the second plasticizers is relatively reduced. Therefore, the effect of securing a fast gelling rate and low plasticizer migration characteristics together with the above-described carbon emission reduction effect and excellent plasticization efficiency cannot be sufficiently obtained, and thus it is preferable to satisfy the above range.

As described above, the plasticizer composition of the present disclosure includes the citrate-based compound together with the recycled phthalate-based compound, and thus has excellent color, low odor, and a relatively low acid value even when the recycled raw material is used.

Specifically, the plasticizer composition may have an acid value of 0.2 KOH mg/g or less, 0.15 KOH mg/g or less, or 0.12 KOH mg/g or less. There is no specific lower limit, because the lower acid value can be evaluated as the better. In theory, the lower limit may be 0 KOH mg/g. In particular, the high acid value of the plasticizer composition means that there are many impurities in addition to the plasticizer. When there are many impurities, the color of the plasticizer may change from colorless and transparent to yellow or brown, or the odor may be severe. Alternatively, migration resistance of the final product using the plasticizer having a high acid value may deteriorate. Thus, it is preferable that the plasticizer composition maintains the acid value within the above range.

In addition, the plasticizer composition may have a yellow index of 120 or less, 100 or less, or 90 or less, when measured according to ASTM D1209 and E313.

In addition, the plasticizer composition may have a carbon emission reduction rate of 5% or more, or 5% or more and 40% or less. The carbon emission reduction rate of the plasticizer composition is a value calculated in comparison with a plasticizer composition containing a pure phthalate-based compound instead of the recycled phthalate-based compound, and corresponds to the carbon emission reduction rate with the use of R-DOTP instead of pure DOTP.

Specifically, the carbon emission reduction rate (%) of the plasticizer composition can be calculated as in Equation 1 below.

$$\text{Carbon emission reduction rate (\%)} = 100 - [(A1/A2) \times 100] \quad \text{[Equation 1]}$$

In Equation 1,

A1 represents carbon emissions (tCO$_2$ eq/MT) with respect to a plasticizer composition according to the present disclosure, and A2 represents carbon emissions (tCO$_2$ eq/MT) with respect to a control plasticizer composition.

Specifically, A1 corresponds to total carbon emissions (tCO$_2$ eq/MT) according to the composition ratio of each component contained in the plasticizer composition. A2 corresponds to total carbon emissions (tCO$_2$ eq/MT) according to the composition ratio of each component of a control plasticizer composition using the same composition as the plasticizer composition measured in A1, but containing a pure phthalate compound (pure-DOTP) instead of the recycled phthalate-based compound (R-DOTP). Herein, the unit of the carbon emissions is a weight equivalent (eq) of total CO$_2$ emissions per metric ton.

For example, the carbon emissions (A1) with respect to the plasticizer composition containing R-DOTP and TBC at 80:20 is 0.502 tCO$_2$ eq/MT calculated as the sum of carbon emissions of each component according to this composition ratio, that is, carbon emissions of R-DOTP×0.8+carbon emissions of TBC×0.2. The control plasticizer composition with respect to the above plasticizer composition is a plasticizer composition containing DOTP and TBC at 80:20, and the carbon emissions (A2) thereof is 0.571 tCO$_2$ eq/MT calculated as carbon emissions of DOTP×0.8+carbon emissions of TBC×0.2. Therefore, according to Equation 1, the carbon emission reduction rate of the plasticizer composition containing R-DOTP and TBC at 80:20 is 12.08%.

At this time, the carbon emissions of each component used in the plasticizer composition is as follows:

Recycled dioctyl terephthalate (R-DOTP): 0.485 $tCO_2$ eq/MT

Pure dioctyl terephthalate (DOTP, or Pure-DOTP): 0.571 $tCO_2$ eq/MT

Tributyl citrate (TBC): 0.571 $tCO_2$ eq/MT

The carbon emissions of each component used in the plasticizer composition may refer to the value provided by the manufacturer or may be calculated based on the manufacturing process and chemical reaction of each component. A method of calculating the carbon emission reduction rate may be specified in Experimental Example to be described later.

For example, the reduction amount of carbon emissions by using R-DOTP is 0.086 $tCO_2$ eq/MT. [0.571(Pure DOTP)−0.485(R-DOTP)=0.086(15.06%)]. The carbon emissions of pure DOTP can be calculated as 0.571 $tCO_2$ eq/MT and that of R-DOTP can be calculated as 0.485 $tCO_2$ eq/MT.

Preferably, the carbon emission reduction rate of the plasticizer composition may be 5.5% or more, 5.8% or more, 6% or more, 6.5% or more, 6.8% or more, 7% or more, or 7.5% or more. However, considering the actual carbon emissions according to each component of the plasticizer, it may be 40% or less, 30% or less, 25% or less, 20% or less, 18% or less, or 16% or less.

Meanwhile, the plasticizer composition is excellent in physical properties such as gelling properties, plasticization efficiency, and weather resistance when used with a resin. Therefore, the plasticizer composition of the present disclosure can be applied to various polymer resins as a plasticizer.

Resin Composition

Accordingly, according to another embodiment of the present disclosure, there is provided a resin composition including the plasticizer composition; and at least one resin selected from the group consisting of polyvinyl chloride, polystyrene, polyurethane, polypropylene, polybutadiene, silicone, modified silicone, ethylene vinyl acetate resin, and thermoplastic elastomer.

The contents of the resin and the plasticizer in the resin composition are not limited, and may be appropriately adjusted depending on the resin used and the desired physical properties. For example, the resin composition may include 1 to 200 parts by weight, 10 to 150 parts by weight, 20 to 120 parts by weight, or 30 to 80 parts by weight of the above-described plasticizer composition based on 100 parts by weight of the resin.

The resin composition may further include at least one additive selected from the group consisting of stabilizers, fillers and pigments. The additive may be appropriately selected depending on physical properties to be improved in the resin composition.

The stabilizer is added for the purpose of preventing changes in the physical properties of the resin, and includes at least one selected from the group consisting of Ca—Zn-based compounds, K—Zn-based compounds, Ba—Zn-based compounds, organic Tin-based compounds; metallic soap-based compounds, phenol-based compounds, phosphoric acid ester-based compounds and phosphorous acid ester-based compounds.

More specific examples of the stabilizers which may be used in the present disclosure may include Ca—Zn-based compounds; K—Zn-based compounds; Ba—Zn-based compounds; organic Tin-based compounds such as mercaptide-based compounds, maleic acid-based compounds or carboxylic acid-based compounds; metallic soap-based compounds such as Mg-stearate, Ca-stearate, Pb-stearate, Cd-stearate, or Ba-stearate; phenol-based compounds; phosphoric acid ester-based compounds; phosphorous acid ester-based compounds, etc., but the present disclosure is not limited thereto.

The filler is used for the purpose of improving productivity, dry touch feeling, and flame retardant properties of the resin composition, and includes at least one selected from the group consisting of calcium carbonate, talc, titanium dioxide, kaolin, silica, alumina, magnesium hydroxide, aluminum hydroxide, phosphorus-based compounds, melamine-based compounds, phosphorus-melamine complex compounds, boron-based flame retardants, carbon black, carbon nanotube, nano-clay, and clay.

The pigment may be titanium dioxide, carbon black, cadmium-based pigment, or the like.

The resin composition according to the present disclosure may be prepared according to a method commonly known in the art by using the resin, the plasticizer composition, and optionally, the additive. The method is not particularly limited.

In one embodiment, the resin composition may be a vinyl chloride resin composition including a vinyl chloride resin. The vinyl chloride resin composition includes the plasticizer composition according to the present disclosure, thereby exhibiting excellent color, gelling properties and weather resistance.

The vinyl chloride resin may be a homopolymer in which a vinyl chloride monomer is homopolymerized, or a copolymer in which a vinyl chloride monomer and a comonomer copolymerizable therewith are polymerized. Any one or a mixture thereof may be used in the preparation of the vinyl chloride resin composition.

The comonomer copolymerizable with the vinyl chloride monomer may be, specifically, vinyl esters such as vinyl acetate, vinyl propionate, or vinyl stearate; vinyl ethers having an alkyl group such as methyl vinyl ether, ethyl vinyl ether, octyl vinyl ether, or launyl vinyl ether; vinylidene halides such as vinylidene chloride; unsaturated carboxylic acids such as acrylic acid, methacrylic acid, fumaric acid, maleic acid, itaconic acid, maleic anhydride, or itaconic anhydride, and acid anhydrides thereof; unsaturated carboxylic acid esters such as methyl acrylate, ethyl acrylate, monomethyl maleate, dimethyl maleate, or butylbenzyl maleate; aromatic vinyl compounds such as styrene, α-methyl styrene, or divinyl benzene; unsaturated nitriles such as acrylonitrile or methacrylonitrile; olefins such as ethylene or propylene; or cross-linkable monomers such as diallyl phthalate. Any one or a mixture of two or more thereof may be used. Among them, the comonomer may more preferably include vinyl acetate, etc. in terms of excellent compatibility with the vinyl chloride monomer and improving compatibility with the plasticizer constituting the resin composition after polymerization.

As described above, the vinyl chloride resin may be prepared by polymerization of a vinyl chloride monomer alone, or by polymerization of a vinyl chloride monomer and a comonomer copolymerizable therewith. At this time, the polymerization method is not particularly limited, and the polymerization may be performed according to a conventional polymerization method known in the art such as suspension polymerization, bulk polymerization, emulsion polymerization, or seed emulsion polymerization.

The average particle size and uniformity of the vinyl chloride resin can be controlled by adjusting the polymerization conditions. Specifically, the straight vinyl chloride resin prepared by suspension polymerization or bulk polymerization may have an average particle size ($D_{50}$) of 50 μm to 400 μm, and the paste vinyl chloride resin prepared by emulsion polymerization or fine suspension polymerization may have an average particle size ($D_{50}$) of less than 100 μm, preferably 0.1 μm to 40 μm. The average particle size ($D_{50}$) of the vinyl chloride resin may be measured according to a conventional particle size distribution measuring method such as optical microscopy or light scattering measurement.

A bulk density of the vinyl chloride resin measured according to ASTM D 1895 may be in the range of 0.1 g/cm$^3$ to 0.5 g/cm$^3$, or 0.2 g/cm$^3$ to g/cm$^3$. The plasticizer absorption effect may be excellent within the above bulk density range.

The degree of polymerization and the weight average molecular weight of the vinyl chloride resin may affect compatibility with the components constituting the vinyl chloride resin composition, particularly a plasticizer, and processability of the vinyl chloride resin composition, and may be appropriately adjusted by controlling polymerization conditions during polymerization.

Specifically, the vinyl chloride resin may have the degree of polymerization of 500 to 3,000, or the weight average molecular weight (Mw) of 25,000 g/mol to 300,000 g/mol. When the degree of polymerization and the weight average molecular weight are within the above ranges, dispersibility is excellent, compatibility with the plasticizer is good, and processability of the vinyl chloride resin composition can be improved.

If the degree of polymerization of the vinyl chloride resin is less than 500 or the weight average molecular weight is less than 25,000 g/mol, there is a fear that processability and durability of the product after processing may be deteriorated due to insufficient physical properties. When the degree of polymerization is more than 3,000 or the weight average molecular weight is more than 300,000 g/mol, the molecular weight is too high, thereby making it difficult to mold or process. More specifically, the vinyl chloride resin may have the degree of polymerization of 700 or more and less than 1,700 or the weight average molecular weight (Mw) of 45,000 g/mol to 250,000 g/mol.

The weight average molecular weight (Mw) of the vinyl chloride resin is a converted value using standard polystyrene by gel permeation chromatography. In addition, the degree of polymerization of the vinyl chloride resin can be measured according to JIS K 6720-2.

Meanwhile, the resin composition may have an acid value of 0.2 KOH mg/g or less, 0.15 KOH mg/g or less, or 0.12 KOH mg/g or less. There is no specific lower limit, because the lower acid value can be evaluated as the better. In theory, the lower limit may be 0 KOH mg/g.

In addition, the resin composition may have a yellow index (YI) measured according to ASTM E313 of 8 to 19, 9 to 18, 10 to 17, or 11 to 17.

In addition, the resin composition may have a yellow index (YI) measured after 200 hours of UV aging according to ASTM G154 Cycle 2 method of 5 to 18, 6 to 18, 7 to 17, or 10 to 16.

In addition, the resin composition may have a carbon emission reduction rate of 3% or more, or 3% or more and 30% or less. The carbon emission reduction rate of the resin composition is a value calculated in comparison with a vinyl chloride resin composition using a plasticizer composition containing a pure phthalate-based compound instead of the recycled phthalate-based compound, and corresponds to the carbon emission reduction rate with the use of R-DOTP instead of pure DOTP.

Specifically, the carbon emission reduction rate (%) of the resin composition can be calculated as in Equation 2 below.

$$\text{Carbon emission reduction rate (\%)} = 100 - [(A3/A4) \times 100] \quad \text{[Equation 2]}$$

In Equation 2,

A3 represents carbon emissions (tCO$_2$ eq/MT) with respect to a resin composition according to the present disclosure, and A4 represents carbon emissions (tCO$_2$ eq/MT) with respect to a control resin composition.

Specifically, A3 corresponds to total carbon emissions (tCO$_2$ eq/MT) according to the composition ratio of each component contained in the resin composition. A4 corresponds to total carbon emissions (tCO$_2$ eq/MT) according to the composition ratio of each component of the resin composition using a plasticizer composition using the same composition as the resin composition measured in A3, but containing a pure recycled phthalate compound (pure-DOTP) instead of the recycled phthalate-based compound (R-DOTP). Herein, the unit of the carbon emissions is a weight equivalent (eq) of total CO$_2$ emissions per metric ton.

For example, when the resin composition is a vinyl chloride resin composition using 100 parts by weight of polyvinyl chloride (PVC) and 30 parts by weight of a plasticizer containing R-DOTP and TBC at 80:20, the carbon emissions (A3) of the resin composition is calculated as the sum of carbon emissions of each component according to the composition ratio with the weight ratio of PVC, R-DOTP, and TBC of 0.769, 0.185, and 0.046, and is 0.256 tCO$_2$ eq/MT (that is, carbon emissions of PVC×0.769+carbon emissions of R-DOTP×0.185+carbon emissions of TBC×0.046). The control resin composition with respect to the above vinyl chloride resin composition is a resin composition containing PVC, DOTP, and TBC at a weight ratio of 0.769, 0.185, and 0.046, and the carbon emissions (A4) thereof is 0.271 tCO$_2$ eq/MT calculated as carbon emissions of PVC×0.769+carbon emissions of DOTP×0.185+carbon emissions of TBC×0.046. Therefore, according to Equation 2, the carbon emission reduction rate of the vinyl chloride resin composition is 5.54%.

At this time, the carbon emissions of each component used in the resin composition is as follows:

Polyvinyl chloride (PVC, Hanwha Solutions P-1000, degree of polymerization of 1000): 0.182 tCO$_2$ eq/MT Recycled dioctyl terephthalate (R-DOTP): 0.485 tCO$_2$ eq/MT Pure dioctyl terephthalate (DOTP, or Pure-DOTP): 0.571 tCO$_2$ eq/MT Tributyl citrate (TBC): 0.571 tCO$_2$ eq/MT The carbon emissions of each component used in the resin composition may refer to the value provided by the manufacturer or may be calculated based on the manufacturing process and chemical reaction of each component. A method of calculating the carbon emission reduction rate may be specified in Experimental Example to be described later.

Preferably, the carbon emission reduction rate of the resin composition may be 3.2% or more, 3.5% or more, 4% or more, 4.5% or more, 5% or more, 5.5% or more, 6% or more, or 6.5% or more. However, considering the actual carbon emissions according to each component of the plasticizer, it may be 28% or less, 25% or less, 22% or less, 20% or less, 18% or less, or 16% or less.

In addition, the resin composition has excellent color and odor characteristics as described above, and also has excellent plasticization efficiency and a fast gelling rate.

For example, when 50 g to 58 g of the resin composition is put into a Brabender Mixer at a temperature of 90° C. to 98° C. and mixed at 25 rpm to 35 rpm for 10 minutes, a gelling time (sec) of the resin measured by changing the torque in the mixer during processing may be 130 seconds or less, or 10 seconds to 130 seconds. The method for measuring the gelling rate may be more specifically described in Experimental Example described below. Preferably, the gelling time of the resin composition may be 125 seconds or less, 120 seconds or less, 118 seconds or less, 115 seconds or less, or 110 seconds or less. However, considering the actual gelation process of the general resin composition, the gelling time of the resin composition may be 20 seconds or more, 30 seconds or more, 40 seconds or more, 50 seconds or more, or 60 seconds or more.

According to another aspect of the present disclosure, there is provided a molded product including the above resin composition.

The molded product may be used in the manufacture of a food packaging film (e.g., wrap), industrial film, compound, decor sheet, decor tile, soft sheet, hard sheet, wire and cable, wallpaper, foam mat, artificial leather, flooring, tarpaulin, gloves, sealant, gasket of refrigerator, hoses, medical device, geogrids, mesh tarpaulin, toy product, stationery, insulating tape, clothing coatings, label used for clothing or stationery, bottle cap liner, stopper for industrial or other purposes, artificial bait, electronic component (e.g., sleeve), automobile interior material, adhesive, coatings, and the like, but the present disclosure is not limited thereto.

Hereinafter, the present invention will be described in more detail with the following examples. However, the following examples are only for illustrating the present invention, and the scope of the present invention is not limited thereto.

EXAMPLES

Example 1

A plasticizer composition was prepared by mixing recycled dioctyl terephthalate (R-DOTP, acid value of 0.175 KOH mg/g) manufactured by Runzenengyuan of China and tributyl citrate (TBC) at a weight ratio of 80:20.

30 parts by weight of the plasticizer composition and 1.5 parts by weight of a Ba/Zn-based thermal stabilizer (Songwon Industrial BZ-150T) were added based on 100 parts by weight of polyvinyl chloride (PVC, Hanwha Solutions P-1000, degree of polymerization of 1000), and then kneaded with a roll mill to prepare a vinyl chloride resin composition.

Example 2

A plasticizer composition was prepared by mixing recycled dioctyl terephthalate (R-DOTP, acid value of 0.175 KOH mg/g) manufactured by Runzenengyuan of China and tributyl citrate (TBC) at a weight ratio of 50:50.

30 parts by weight of the plasticizer composition and 1.5 parts by weight of a Ba/Zn-based thermal stabilizer (Songwon Industrial BZ-150T) were added based on 100 parts by weight of polyvinyl chloride (PVC, Hanwha Solutions P-1000, degree of polymerization of 1000), and then kneaded with a roll mill to prepare a vinyl chloride resin composition.

Example 3

A vinyl chloride resin composition was prepared in the same manner as in Example 1, except that 50 parts by weight of the plasticizer composition was added based on 100 parts by weight of polyvinyl chloride (PVC, Hanwha Solutions P-1000, degree of polymerization of 1000).

Example 4

A vinyl chloride resin composition was prepared in the same manner as in Example 2, except that 50 parts by weight of the plasticizer composition was added based on 100 parts by weight of polyvinyl chloride (PVC, Hanwha Solutions P-1000, degree of polymerization of 1000).

Comparative Example 1

A vinyl chloride resin composition was prepared in the same manner as in Example 1, except for using recycled dioctyl terephthalate (R-DOTP) manufactured by Runzenengyuan of China as a single component plasticizer.

Comparative Example 2

A vinyl chloride resin composition was prepared in the same manner as in Comparative Example 1, except that pure dioctyl terephthalate (DOTP) was used as a plasticizer instead of recycled dioctyl terephthalate.

Comparative Example 3

A vinyl chloride resin composition was prepared in the same manner as in Comparative Example 1, except for using tributyl citrate (TBC) as a single component plasticizer.

Comparative Example 4

A plasticizer composition and a vinyl chloride resin composition were prepared in the same manner as in Example 1, except that pure dioctyl terephthalate (DOTP) was used instead of recycled dioctyl terephthalate.

Comparative Example 5

A plasticizer composition and a vinyl chloride resin composition were prepared in the same manner as in Example 2, except that pure dioctyl terephthalate (DOTP) was used instead of recycled dioctyl terephthalate.

Comparative Example 6

A plasticizer composition and a vinyl chloride resin composition were prepared in the same manner as in Example 3, except that pure dioctyl terephthalate (DOTP) was used instead of recycled dioctyl terephthalate.

Comparative Example 7

A plasticizer composition and a vinyl chloride resin composition were prepared in the same manner as in Example 4, except that pure dioctyl terephthalate (DOTP) was used instead of recycled dioctyl terephthalate.

Experimental Examples

Each of the plasticizer compositions and the vinyl chloride resin compositions of Examples and Comparative Examples was evaluated by the following method, and the results are shown in Table 1.

(1) Carbon Emission Reduction Rate (%)

Carbon emission reduction rates (%) with respect to the plasticizer compositions of Examples and Comparative Examples were calculated according to Equation 1 below.

Carbon emission reduction rate (%)=100−[($A1/A2$)× 100]  [Equation 1]

In Equation 1,
A1 represents carbon emissions ($tCO_2$ eq/MT) with respect to a plasticizer composition, and
A2 represents carbon emissions ($tCO_2$ eq/MT) with respect to a control plasticizer composition.

Specifically, in Equation 1, A1 corresponds to total carbon emissions ($tCO_2$ eq/MT) according to the composition ratio of each component contained in the plasticizer composition. A2 corresponds to total carbon emissions ($tCO_2$ eq/MT) according to the composition ratio of each component of a control plasticizer composition using the same composition as the plasticizer composition measured in A1, but containing a pure phthalate compound (pure-DOTP) instead of the recycled phthalate-based compound (R-DOTP). Herein, the unit of the carbon emissions is a weight equivalent (eq) of total $CO_2$ emissions per metric ton.

In addition, carbon emission reduction rates (%) with respect to the vinyl chloride resin compositions of Examples and Comparative Examples were calculated according to Equation 2 below.

Carbon emission reduction rate (%)=100−[($A3/A4$)× 100]  [Equation 2]

In Equation 2,
A3 represents carbon emissions ($tCO_2$ eq/MT) with respect to a resin composition, and
A4 represents carbon emissions ($tCO_2$ eq/MT) with respect to a control resin composition.

Specifically, in Equation 2, A3 corresponds to total carbon emissions ($tCO_2$ eq/MT) according to the composition ratio of each component contained in the resin composition. A4 corresponds to total carbon emissions ($tCO_2$ eq/MT) according to the composition ratio of each component of the resin composition using a plasticizer composition using the same composition as the resin composition measured in A3, but containing a pure recycled phthalate compound (pure-DOTP) instead of the recycled phthalate-based compound (R-DOTP). Herein, the unit of the carbon emissions is a weight equivalent (eq) of total $CO_2$ emissions per metric ton.

For example, the carbon emissions (A1) with respect to the plasticizer composition of Example 1 containing R-DOTP and TBC at 80:20 is 0.502 $tCO_2$ eq/MT calculated as the sum of carbon emissions of each component according to this composition ratio. In addition, the carbon emissions (A3) with respect to the vinyl chloride resin composition of Example 1 is 0.256 $tCO_2$ eq/MT calculated as the sum of carbon emissions of each component according to this composition ratio, wherein the vinyl chloride resin composition uses 30 parts by weight of the plasticizer containing R-DOTP and TBC at 80:20 with 100 parts by weight of polyvinyl chloride (PVC), and the composition of each component PVC, R-DOTP, and TBC contained in the vinyl chloride resin composition has a weight ratio of 0.769, 0.185, and 0.046.

At this time, the carbon emissions of each component used in the plasticizer composition and the vinyl chloride resin composition of Examples and Comparative Examples is as follows:

Polyvinyl chloride (PVC, Hanwha Solutions P-1000, degree of polymerization of 1000): 0.182 $tCO_2$ eq/MT Recycled dioctyl terephthalate (R-DOTP): 0.485 $tCO_2$ eq/MT Pure dioctyl terephthalate (DOTP, or Pure-DOTP): 0.571 $tCO_2$ eq/MT Tributyl citrate (TBC): 0.571 $tCO_2$ eq/MT Among them, the carbon emissions of polyvinyl chloride (PVC) and pure dioctyl terephthalate (DOTP, or Pure-DOTP) referred to the value provided by the manufacturer. In addition, the carbon emissions of the heat stabilizer added in a relatively small amount in the resin composition was excluded. In addition, the carbon emissions of recycled dioctyl terephthalate (R-DOTP) was calculated assuming that the carbon emissions of recycled PTA used for R-DOTP is 70% of that of pure PTA, and the carbon emissions of PTA and the carbon emissions of 2-EH are the same. PTA (pured terephthalic acid) and 2-EH (2-ethylhexanol) are raw materials for manufacturing DOTP. In addition, the carbon emissions of tributyl citrate (TBC) was calculated assuming that the carbon emissions of TBC produced by a chemical reaction similar to that of Pure-DOTP is the same as the carbon emissions of Pure-DOTP.

In addition, the reduction amount of carbon emissions by using R-DOTP is 0.086 $tCO_2$ eq/MT. [0.571(Pure DOTP)− 0.485(R-DOTP)=0.086(15.06%)]. The carbon emissions of pure DOTP can be calculated as 0.571 $tCO_2$ eq/MT and that of R-DOTP can be calculated as 0.485 $tCO_2$ eq/MT.

(2) Volatile Loss (%)

20 g of each of the prepared plasticizer compositions was placed in a glass Petri dish (diameter of 90 mm), and the amount of volatilized plasticizer at 200° C. for 1 hour was measured. The volatile loss was calculated according to Equation 3 below.

Volatile loss (%)=[(weight of plasticizer after test)/ (weight of plasticizer before test)]×100  [Equation 3]

(3) Color Evaluation

A flat sheet having a thickness of about 2 mm was prepared by sequentially performing roll mill processing (170° C., 3 minutes) and press processing (180° C., 8 minutes) on the vinyl chloride resin composition.

For the specimen prepared above, a yellow index (YI) was measured according to ASTM E313.

(4) Odor Evaluation

Odor evaluation for the prepared plasticizer composition was performed by a sensory evaluation. The odor of the plasticizer composition was scored from the lowest score of 1 to the highest score of 5 with the trend of reduction of odors such as oil. That is, the odor evaluation was expressed as 5 (excellent, excellent without odor)>4>3 (good)>2>1 (very poor, bad odor). When manufacturing the final resin product, it should be grade 3 or higher in terms of preventing quality deterioration due to odor problems caused by plasticizers.

(4) Gelling Rate 54 g of the vinyl chloride resin composition was put into a Brabender Mixer at 95° C., and mixed at 30 rpm for 10 minutes. The gelling time (sec) of the resin was analyzed by changing the torque in the mixer during processing.

(5) Plasticizer Migration Resistance (%)

A flat sheet having a thickness of about 2 mm was prepared by sequentially performing roll mill processing (170° C., 3 minutes) and press processing (180° C., 8 minutes) on the vinyl chloride resin composition, and the prepared sheet was cut into a circular specimen having a diameter of about 4 cm. An oil-absorbing paper made of polypropylene was placed on the upper/lower part of the specimen and left at 60° C. under a load of 5 kg for 7 days to promote plasticizer migration. After the plasticizer migration experiment was completed, the weight change rates of the specimen and the oil paper were measured.

The weight change rate of the specimen was calculated as [(weight change of specimen/weight of specimen before test)×100], and the weight change rate of oil paper was calculated as [(weight change of oil paper/weight of oil paper before test)×100]. The weight loss of the specimen is the same as the weight gain of the oil paper, so in this experiment, plasticizer migration resistance (%) was evaluated only with the weight change rate of the specimen.

(6) Hardness (Plasticization Efficiency)

A flat sheet having a thickness of about 2 mm was prepared by sequentially performing roll mill processing (170° C., 3 minutes) and press processing (180° C., 8 minutes) on the vinyl chloride resin composition.

Based on the ASTM D2240 method, a needle of a hardness tester (Type A) was completely lowered to one place of the specimen to read a hardness value after 5 seconds. After testing three places for each specimen, the average value thereof was taken. The measured hardness value is used as an index indicating the plasticization efficiency.

TABLE 1

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|
| Plasticizer composition | R-DOTP/TBC (8:2) | R-DOTP/TBC (5:5) | R-DOTP/TBC (8:2) | R-DOTP/TBC (5:5) | R-DOTP | Pure-DOTP | TBC | DOTP/TBC (8:2) | DOTP/TBC (5:5) | DOTP/TBC (8:2) | DOTP/TBC (5:5) |
| PVC content (parts by weight) | 100 | 100 | 100 | 100 | 100 | 100 | 100 | 100 | 100 | 100 | 100 |
| Plasticizer content (parts by weight) | 30 | 30 | 50 | 50 | 30 | 30 | 30 | 30 | 30 | 50 | 50 |
| Carbon emissions of plasticizer composition (tCO2 eq/MT) | 0.502 | 0.529 | 0.502 | 0.529 | 0.485 | 0.571 | 0.571 | 0.571 | 0.572 | 0.571 | 0.572 |
| Carbon emission reduction rate of plasticizer composition (%) | 12.08 | 7.52 | 12.08 | 7.52 | 15.06 | 0 | 0 | 0 | 0 | 0 | 0 |
| Carbon emissions of vinyl chloride resin composition (tCO2 eq/MT) | 0.256 | 0.262 | 0.288 | 0.297 | 0.252 | 0.272 | 0.272 | 0.271 | 0.272 | 0.311 | 0.311 |
| Carbon emission reduction rate of vinyl chloride resin composition (%) | 5.54 | 3.68 | 7.40 | 4.50 | 7.35 | 0 | 0 | 0 | 0 | 0 | 0 |
| Volatile loss of plasticizer (%) | 1.9 | 2.2 | 1.9 | 2.2 | 1.5 | 1.2 | 2.9 | 1.7 | 2.0 | 1.7 | 2.1 |
| Initial coloration (Color, YI) | 17 | 15 | 13 | 11 | 23 | 17 | 13 | 16 | 12 | 13 | 11 |
| Odor grade | 3 | 4 | 3 | 4 | 1 | 4 | 4 | 4 | 5 | 4 | 5 |
| Gelling time (sec) | 110 | 98 | 88 | 61 | 170 | 168 | 80 | 112 | 101 | 87 | 62 |

TABLE 1-continued

|  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|
| Plasticizer migration (%) | 0.5 | 0.8 | 0.3 | 0.4 | 1.4 | 1.4 | 0.2 | 0.5 | 0.8 | 0.3 | 0.4 |
| Hardness (Shore A) | 86 | 85 | 64 | 62 | 88 | 88 | 85 | 85 | 84 | 65 | 61 |

Referring to Table 1, it was confirmed that the plasticizer composition of the present disclosure had good odor and excellent color even including the recycled phthalate-based compound, and exhibited a fast gelling rate and low plasticizer migration characteristics with high plasticization efficiency.

The invention claimed is:

1. A plasticizer composition, comprising
    a) a recycled phthalate-based compound as a first plasticizer; and
    b) a citrate-based compound as a second plasticizer,
    wherein the first plasticizer has an acid value of 0.175 KOH mg/g to 0.2 KOH mg/g,
    wherein 100 parts by weight of the plasticizer composition comprises 15 to 90 parts by weight of the first plasticizer, and 10 to 85 parts by weight of the second plasticizer,
    wherein the plasticizer composition has an acid value of 0.12 KOH mg/g or less, and
    wherein carbon emission reduction rate of the plasticizer composition is 5% or more, which is calculated as in Equation 1 below:

Carbon emission reduction rate (%)=100−[(A1/A2)×100]   [Equation 1]

In Equation 1,
    A1 represents carbon emissions ($tCO_2$ eq/MT) with respect to the plasticizer composition, and
    A2 represents carbon emissions ($tCO_2$ eq/MT) with respect to a control plasticizer composition.

2. The plasticizer composition of claim 1, wherein 100 parts by weight of the plasticizer composition comprises 30 to 85 parts by weight of the first plasticizer, and 15 to 70 parts by weight of the second plasticizer.

3. The plasticizer composition of claim 1, wherein the first plasticizer is at least one selected from the group consisting of recycled dibutyl phthalate, recycled dihexyl phthalate, recycled dioctyl phthalate, recycled di-n-octyl phthalate, recycled diisononyl phthalate, recycled diisodecyl phthalate, recycled dibutyl isophthalate, recycled dioctyl isophthalate, recycled diisononyl isophthalate, recycled diisodecyl isophthalate, recycled dibutyl terephthalate, recycled dioctyl terephthalate, recycled diisononyl terephthalate, and recycled diisodecyl terephthalate.

4. The plasticizer composition of claim 1, wherein the second plasticizer is at least one selected from the group consisting of triethyl citrate, acetyl triethyl citrate, tributyl citrate, acetyl tributyl citrate, trioctyl citrate, acetyl trioctyl citrate, trihexyl citrate, and acetyl trihexyl citrate.

5. The plasticizer composition of claim 1, wherein the first plasticizer is recycled dioctyl terephthalate; and the second plasticizer is at least one selected from the group consisting of tributyl citrate, and acetyl tributyl citrate.

6. The plasticizer composition of claim 1, further comprising at least one compound selected from the group consisting of trimellitate-based compounds, aliphatic ester-based compounds, and epoxidized vegetable oils.

7. The plasticizer composition of claim 1, wherein 100 parts by weight of the plasticizer composition comprises 50 to 80 parts by weight of the first plasticizer, and 20 to 50 parts by weight of the second plasticizer.

8. The plasticizer composition of claim 1, wherein a weight ratio of the first plasticizer to the second plasticizer (the first plasticizer:the second plasticizer) is 80:20 to 50:50.

9. A resin composition comprising
    the plasticizer composition of claim 1; and
    at least one resin selected from the group consisting of polyvinyl chloride, polystyrene, polyurethane, polypropylene, polybutadiene, silicone, modified silicone, ethylene vinyl acetate resin, and thermoplastic elastomer.

10. The resin composition of claim 9, wherein the plasticizer composition is included in an amount of 1 part by weight to 200 parts by weight based on 100 parts by weight of the resin.

11. The resin composition of claim 9, wherein a yellow index (YI) measured according to ASTM E313 is 8 to 19.

12. The resin composition of claim 9, wherein a yellow index (YI) measured after 200 hours of UV aging according to ASTM G154 Cycle 2 method is 5 to 18.

13. A molded product comprising the resin composition of claim 9.

* * * * *